(12) United States Patent
Carey

(10) Patent No.: US 6,676,135 B2
(45) Date of Patent: Jan. 13, 2004

(54) OIL TRANSFER SEAL ASSEMBLY

(75) Inventor: Clinton E. Carey, Monroe, MI (US)

(73) Assignee: General Motors Corporation, Detroit, MI (US)

( * ) Notice: Subject to any disclaimer, the term of this patent is extended or adjusted under 35 U.S.C. 154(b) by 3 days.

(21) Appl. No.: 10/115,169

(22) Filed: Apr. 3, 2002

(65) Prior Publication Data

US 2003/0201610 A1 Oct. 30, 2003

(51) Int. Cl.[7] .............................................. F02F 11/00
(52) U.S. Cl. ...................... 277/594; 277/596; 277/598; 277/600
(58) Field of Search ................... 277/594, 596, 277/598, 599, 609, 630, 624

(56) References Cited

U.S. PATENT DOCUMENTS

| | | | | | |
|---|---|---|---|---|---|
| 1,462,133 | A | * | 10/1923 | Oven | 277/598 |
| 1,771,604 | A | * | 7/1930 | Bailey | 277/600 |
| 1,798,246 | A | * | 3/1931 | Braner | 277/598 |
| 1,829,248 | A | * | 10/1931 | Victor | 277/598 |
| 1,846,402 | A | * | 2/1932 | Oven | 277/601 |
| 1,893,881 | A | * | 1/1933 | Braner | 277/601 |
| 2,167,643 | A | * | 8/1939 | Dickson | 277/600 |
| 3,448,986 | A | * | 6/1969 | Jelinek et al. | 277/596 |
| 3,519,279 | A | * | 7/1970 | Wagner | 411/542 |
| 3,570,374 | A | * | 3/1971 | Stratton | 92/171.1 |
| 3,653,674 | A | * | 4/1972 | Bennigsen | 277/650 |
| 3,738,558 | A | * | 6/1973 | Colwell | 277/592 |
| 4,508,777 | A | * | 4/1985 | Yamamoto et al. | 442/415 |
| 4,602,125 | A | * | 7/1986 | West et al. | 174/138 G |
| 4,830,698 | A | * | 5/1989 | DeCore et al. | 156/219 |
| 4,867,461 | A | * | 9/1989 | Shimmell | 277/593 |
| 5,022,431 | A | * | 6/1991 | Grey et al. | 137/375 |
| 5,044,641 | A | * | 9/1991 | Belter | 277/598 |
| 5,121,932 | A | * | 6/1992 | Goldman et al. | 277/600 |
| 5,375,851 | A | * | 12/1994 | Mockenhaupt | 277/598 |
| 5,513,603 | A | * | 5/1996 | Ang et al. | 123/90.37 |
| 5,944,360 | A | | 8/1999 | Crapart | |
| 6,371,489 | B1 | * | 4/2002 | Combet et al. | 277/594 |

* cited by examiner

*Primary Examiner*—Alison K. Pickard
(74) *Attorney, Agent, or Firm*—Leslie C. Hodges

(57) ABSTRACT

A seal assembly and method of making a seal assembly for a transmission that provides a plurality of pressurized fluid connections. The seal assembly is formed between two adjacent plates that have corresponding holes that include axially extending perimeter walls. An elastomeric sealing element is over molded onto a first plate to line the holes and cover the perimeter walls. The second plate is assembled to the first plate.

16 Claims, 2 Drawing Sheets

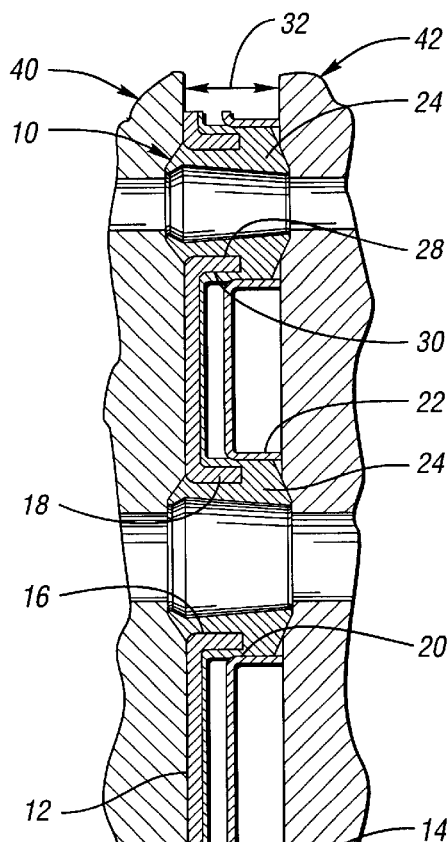
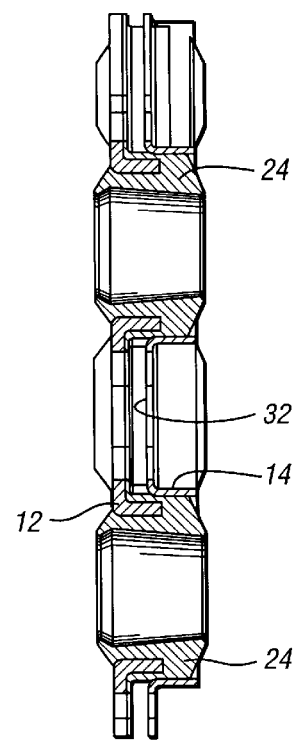
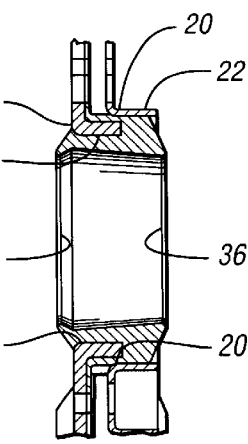
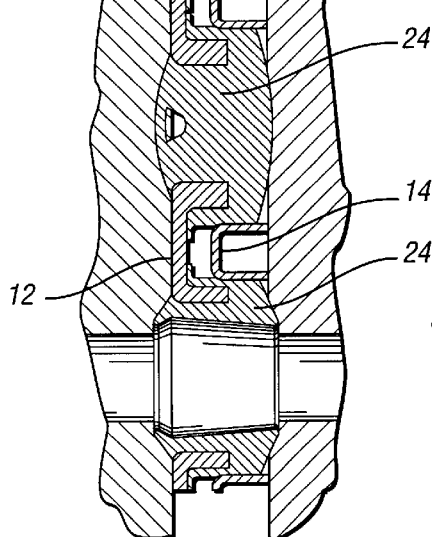
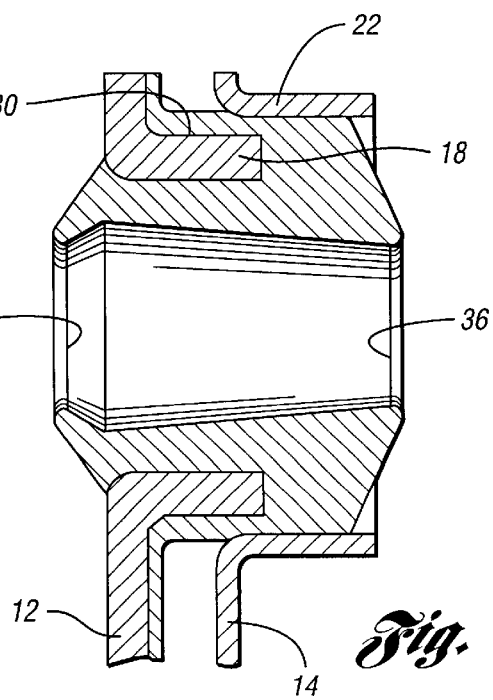

OIL TRANSFER SEAL ASSEMBLY

TECHNICAL FIELD

The present invention relates to an oil transfer seal assembly that provides multiple pressurized fluid connections between two components of a vehicle transmission.

BACKGROUND OF THE INVENTION

An oil transfer seal assembly is a transmission part that is used to provide multiple pressurized fluid connections between adjacent components of an automatic transmission. Automatic transmissions have pressurized transmission fluid that is ported according to a transmission control strategy to clutches, valve bodies and pumps. In some instances, adjacent components of the transmission have parallel faces that may define a gap with a high tolerance.

One prior art seal assembly that is designed to operate in this environment is disclosed in U.S. Pat. No. 5,944,360. The device disclosed in the '360 patent is costly to manufacture because it requires elastomer to be bonded to a plurality of individual tubes. Processing the tubes to prepare them for bonding and removal of flash requires expensive handling and manufacturing steps. The tubes in the '360 patent must be assembled onto a stamped sheet steel carrier. After initial assembly, the tubes can tip or fall out of the stamped steel carrier during shipment and/or handling causing assembly problems when the transmission is assembled. The tubes can tip once installed in the transmission and could potentially cause a leak.

It would be desirable to provide an oil transfer seal assembly that is inexpensive to manufacture and more robust than the design shown and disclosed in U.S. Pat. No. 5,944,360.

These and other problems and challenges are addressed by the present invention as summarized below.

SUMMARY OF THE INVENTION

According to the present invention, an oil transfer seal assembly for a transmission is provided that includes first and second plates having first and second sets of holes, respectively, that are aligned when the first and second plates are assembled together. The holes in the first and second plates each being formed by an axially extending perimeter wall. An elastomeric seal element is bonded to the axially extending perimeter walls of the holes in the first plate. The first plate, second plate, and seal element cooperate to form a plurality of pressurized fluid connections extending through the first and second plates. The perimeter walls of the first and second sets of holes partially overlap and support the seal element as the seal assembly seals the gap between adjacent transmission components.

According to another aspect of the invention, the elastomeric seal element is molded over the inner diameter and outer diameter of the axially extending perimeter walls of the first set of holes in the first plate.

According to other aspects of the present invention, the axially extending perimeter walls of the first plate extend into the second set of holes in the second plate. The axially extending perimeter walls of the second plate may extend from the second plate away from the first plate. The axially extending walls of the first plate and the axially extending walls of the second plate may extend in the same direction. Alternatively, the axially extending walls of the first and second plates may extend toward each other.

According to another aspect of the invention, the elastomeric seal element may have an inner diameter portion lining the perimeter walls of the first set of holes that extends axially through the holes. First and second lips are formed on opposite axial ends of the inner diameter portion of the elastomeric seal element.

According to another aspect of the invention, a method is provided for making an oil transfer seal assembly. The method includes providing first and second plates in which a plurality of holes are formed in corresponding locations. An axially extending perimeter wall is formed on each of the holes in the first and second plates. An elastomeric seal element is molded onto the perimeter wall of the holes in the first plate. The second plate is assembled to the first plate with the axially extending walls of the second plate receiving the axially extending walls of the first plate, with a portion of the elastomeric seal being disposed between the axially extending walls of the first plate and the axially extending walls of the second plate.

According to another aspect of the invention, the holes are formed by punching in a sheet metal forming operation. The axially extending perimeter walls formed on each of the holes may be formed by upsetting the perimeter of each hole in a subsequent sheet metal forming operation.

According to another aspect of the method, the elastomeric seal molding step comprises bonding the elastomeric seal to the plate and forming lips at opposite axial ends of the perimeter walls formed around the holes in the first plate.

According to yet another aspect of the invention, the step of assembling the second plate to the first plate may further comprise radially compressing a portion of the elastomeric seal between axially extending perimeter walls of the first and second plates to retain the second plate on the first plate. The method may also include forming alignment features on either or both of the first and second plates by stamping the plates or over-molding an alignment element in the elastomeric seal portion.

These and other features and aspects of the invention will be better understood in view of the attached drawings and following detailed description of the method and apparatus.

BRIEF DESCRIPTION OF THE DRAWINGS

FIG. 3 is a cross-sectional view taken along line 3—3 in FIG. 2 that shows the two transmission components being sealed;

FIG. 4 is a cross-sectional view taken along line 4—4 in FIG. 2;

FIG. 5 is a cross-sectional view taken along line 5—5 in FIG. 2; and FIG. 6 is an enlarged cross-sectional view of a hole and two plates with an oil transfer seal.

DESCRIPTION OF THE PREFERRED EMBODIMENT

Figure 1:
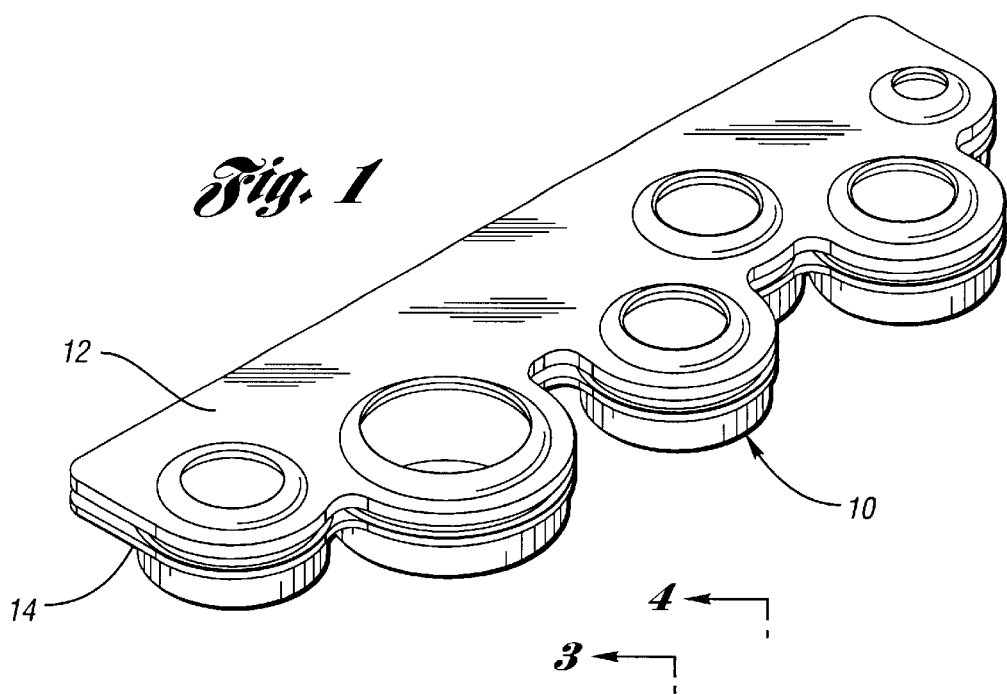
FIG. 1 is a perspective view of the oil transfer seal assembly.
Figure 2:
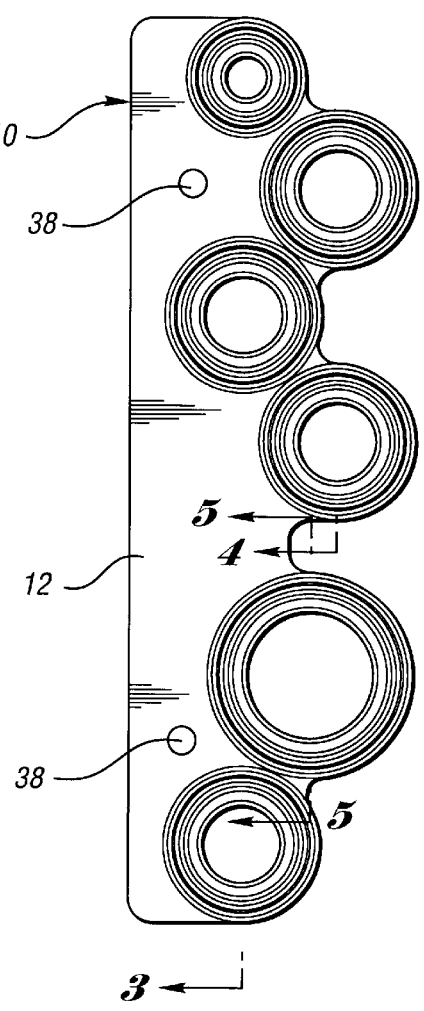
FIG. 2 is a plan view of the oil transfer seal assembly.

Referring now to FIGS. 1–3, an oil transfer seal assembly is generally referred to by reference numeral 10. A first plate 12 and a second plate 14 are secured together and form part of the oil transfer seal assembly. A first set of holes 16 having axially extending walls 18 are provided on the first plate 12. A second set of holes 20 have axially extending walls 22. In the illustrated embodiment, both of the axially extending walls 18, 22 extend in the same direction with the axially extending walls 18 being received in the second set of holes 20 in the second plate 14. Seals 24 are over-molded with an elastomer on the first plate 12. The seals 24 are molded elastomeric seals that are bonded during the molding process to the inner diameter 28 and outer diameter 30 of the axially extending walls 18. The seals 24 extend through both the first and second sets of holes 16, 20.

Referring now to FIG. 2, two alignment features 38 are shown and are generally in the form of two circular depressions on the first plate 12. The alignment features 38 are used to facilitate locating the seal assembly when it is assembled and also when it is installed in the transmission.

Referring now to. FIGS. 3–4, a gap 32 is formed between the first and second transmission components 40, 42. The gap is a high tolerance gap that results from locating separately formed transmission components within the transmission housing. Tolerance stack up of separately manufactured components is compensated for by the oil transfer seal assembly.

Referring now to FIGS. 5–6, a first lip 34 is proximate the first hole 16. A second lip 36 is formed inboard of the axially extending walls 22 of the second set of holes 20. The first lip 34 and second lip 36 are adapted to receive ports, tubes and other pressurized fluid conduits or openings. The first lip 34 and second lip 36 establish a seal with the ports, tubes or other fluid conduits.

As best shown in FIG. 6, a portion of the elastomeric seal on the outer diameter 30 of the axially extending walls 18 is compressed by walls 22 against the axially extending walls 18 when the second plate 14 is assembled to the first plate 12. When the first and second components 40, 42 are assembled to the seal assembly 10 multiple pressurized fluid connections are formed by the openings in the seals 24 between the first and second components 40, 42.

The method for making an oil transfer seal assembly 10 includes providing first and second plates 12, 14 in which two sets of holes 16, 18 are formed in corresponding locations. Axially extending perimeter walls 18, 22 are formed on the holes 16, 18 in the first and second plates 12, 14. An elastomeric seal element 24 is molded onto the perimeter walls 18 of the holes 16 in the first plate 12. The second plate 14 is assembled to the first plate 12 with the axially extending walls 22 of the second plate 14 receiving the axially extending walls 18 of the first plate 12, with a portion of the elastomeric seal 24 being disposed between the axially extending walls 18 of the first plate 12 and the axially extending walls 22 of the second plate 14.

The holes 16, 20 are formed by punching in a sheet metal forming operation. The axially extending perimeter walls 18, 22 are formed on each of the holes 16, 18 by upsetting the perimeter of each hole 16, 20 in a subsequent sheet metal forming operation.

The elastomeric seal 24 is bonded to the plate and the lips 34, 36 are formed around the holes 16 in the first plate.

The second plate 14 is assembled to the first plate 12 by radially compressing a portion of the elastomeric seal 24, as previously mentioned, between axially extending perimeter walls 20, 22 of the first and second plates 12, 14 to retain the second plate 14 on the first plate 12.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An oil transfer seal assembly for a transmission having first and second transmission components defining a gap therebetween, comprising:
   a first plate having a first set of holes through which a fluid flows, the first set of holes each being formed by an axially extending perimeter wall;
   a second plate having a second set of holes corresponding to the first set of holes through which the fluid flows, the second set of holes each being formed by an axially extending perimeter wall;
   an elastomeric seal element bonded to the axially extending perimeter walls of the first set of holes; and
   wherein the first plate, second plate, and seal element cooperate to form a plurality of pressurized fluid connections through the first and second plates, and wherein the perimeter walls of the first and second sets of holes partially overlap and support the seal element therebetween as the seal assembly seals the gap between the first and second transmission components.

2. The oil transfer seal assembly of claim 1 wherein the elastomeric seal element is molded over the inner diameter and outer diameter of said axially extending perimeter walls which form the second set of holes.

3. The oil transfer seal assembly of claim 1 wherein the axially extending perimeter walls of the first plate extend into the second set of holes in the second plate.

4. The oil transfer seal assembly of claim 3 wherein the axially extending perimeter walls of the second plate extend from the second plate away from the first plate.

5. The oil transfer seal assembly of claim 1 wherein the axially extending walls of the first plate and the axially extending walls of the second plate extend in the same direction.

6. The oil transfer seal assembly of claim 1 wherein the gap formed between the first and second transmission components is a high tolerance gap and the elastomeric seal element provides a seal between the components.

7. The oil transfer seal assembly of claim 1 wherein the elastomeric seal element has an inner diameter portion lining the perimeter walls of the first set of holes and extending axially through the holes, and first and second lips formed on opposite axial ends of the inner diameter portion.

8. The oil transfer seal assembly of claim 1 wherein at least one alignment feature is provided on the seal assembly to facilitate locating the seal assembly when it is installed in the transmission.

9. A method of making an oil transfer seal assembly comprising:
   providing a first plate and a second plate;
   forming a plurality of holes in the first and second plates in corresponding locations;
   forming an axially extending perimeter wall on each of the holes in the first and second plates;
   molding an elastomeric seal onto the perimeter wall of the holes in the first plate;
   assembling the second plate to the first plate with the axially extending walls of the second plate receiving the axially extending walls of the first plate with a portion of the elastomeric seal being disposed between the axially extending walls of the first plate and the axially extending walls of the second plate.

10. The method of claim 9 wherein the step of forming a plurality of holes comprises punching holes in a sheet metal forming operation.

11. The method of claim 9 wherein the step of forming an axially extending perimeter wall on each of the plurality of holes comprises upsetting the perimeter of each hole in a sheet metal forming operation.

12. The method of claim 9 wherein the step of molding an elastomeric seal further comprises bonding the elastomeric seal to the plate and forming lips at opposite axial ends of the perimeter wall in the first plate.

13. The method of claim 9 wherein the step of assembling the second plate to the first plate further comprises radially compressing the elastomeric seal between the axially extending perimeter walls of the first and second plates to retain the second plate on the first plate.

14. The method of claim 9 further comprising forming alignment features on the first plate.

15. The method of claim 9 further comprising forming alignment features on the second plate.

16. The method of claim 9 further comprising forming alignment features on the first plate and on the second plate in locations corresponding to the alignment features on the first plate.

* * * * *